J. F. STARK.
HARVESTER-RAKE.

No. 183,824. Patented Oct. 31, 1876.

Witnesses
Fred G. Dietrich
Wm. H. Lister

Inventor.
Jos. F. Stark
per Lafayette Bingham & Co.
Attys

UNITED STATES PATENT OFFICE.

JOSEPH F. STARK, OF KNOB LICK, MISSOURI.

IMPROVEMENT IN HARVESTER-RAKES.

Specification forming part of Letters Patent No. 183,824, dated October 31, 1876; application filed August 19, 1876.

*To all whom it may concern:*

Be it known that I, JOSEPH F. STARK, of Knob Lick, in the county of St. Francois and State of Missouri, have invented certain new and useful Improvements in Harvesters; and I do hereby declare that the following is a full, clear, and exact description thereof, which will enable others skilled in the art to which it pertains to make and use the same, reference being had to the accompanying drawing, and to the letters of reference marked thereon, which form a part of this specification, and in which—

Figure 1:
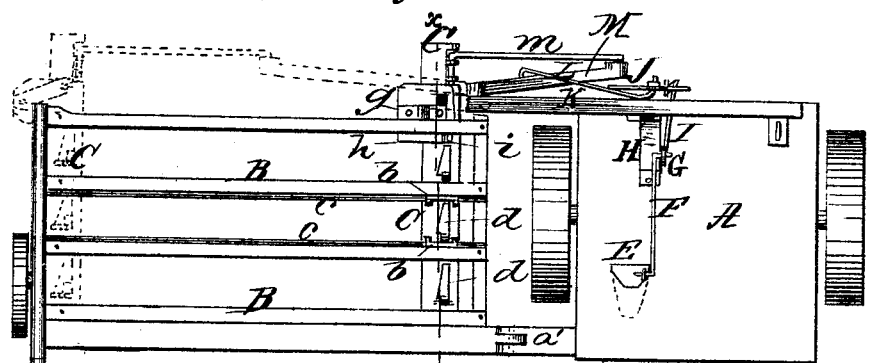
Figure 2:
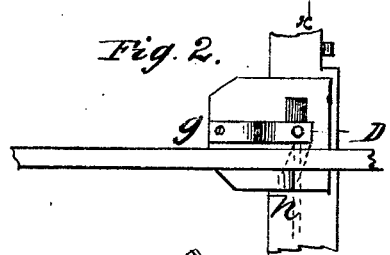
Figure 5:
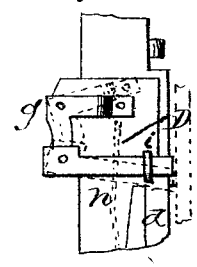
Figure 3:
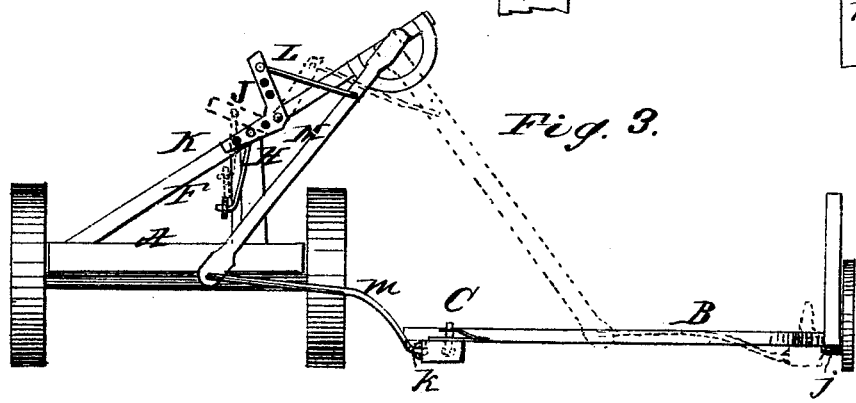
Figure 4:
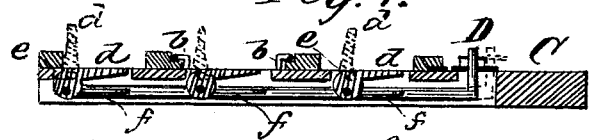
Figure 6:
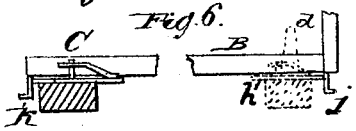

Figure 1 is a plan view of my improved harvester; Fig. 2, a detached view of the rake; Fig. 3, an elevation of the harvester; and Fig. 4, a section through the dotted line $x\,x$ of Fig. 1. Figs. 5 and 6 are detail views.

Corresponding parts in the several figures are denoted by like letters.

This invention relates to a certain improvement in harvesters, and has particular reference to the rake which takes the gavel from the platform, it consisting of mechanism for operating the rake and its teeth, substantially as hereinafter more fully set forth.

In the annexed drawing, A refers to a platform or support upon wheels, and having a tongue, $a$, and upon which the driver's seat is mounted. From one side of this platform extends a bar, $a'$, to which is pivoted or hinged the gavel-platform B, composed of a series of slats extending lengthwise thereof. C is the rake hung to the lower side of the gavel-platform out of the way of the cut grain, falling or being gathered, upon the platform B. The means by which the rake is hung from the platform B consists of arms or frames $b\,b$, or other suitable medium, resting at their free ends or portions upon flanges $c\,c$ of two opposite slats of the gavel-platform B, upon which they travel or move as the rake is operated. The rake is grooved to receive, in a lying position, teeth $d\,d$. The teeth $d\,d$ are pivoted in the rake at $e\,e$, and connected or linked, as at $f\,f$, to a rod, D, having a limited endwise movement in the rake-head, by which the teeth may be caused to occupy a standing position or a horizontal one, as will be further explained hereinafter. The outer or rear end of the rod D extends up through the rake-head, and is bolted or otherwise attached to a bell-crank, $g$, fulcrumed to the rake-head. To the other arm of this crank is pivoted a slide, $h$, its free end moving in a guide or staple, $i$.

It will be observed when the rake is in the position indicated at $x\,x$, Fig. 1, the teeth will occupy a lying or horizontal position, and will maintain such position until the rake, as it is in motion or being operated, reaches the opposite end of the platform, or the position indicated in dotted lines, same figure, when the outer or one end of the slide $h$ will strike a pendant or projection, $j$, upon the lower side of the platform, and elevate or cause the teeth to occupy a standing position.

The grain received upon the platform in the meantime is now removed therefrom upon the return movement of the rake by the elevated teeth.

The rake having delivered its load and returned to its original position, $x\,x$, the opposite or inner end of the slide $h$ will strike another pendant or stud, $k$, depending from the lower side of the gavel-platform B, and bring the teeth to a horizontal position, in readiness for a second forward movement of the rake across the platform B, and to prevent interference with the grain as it is received thereon.

The inner or lower ends of the rake-teeth are of a cam shape, and so hung or pivoted as to avoid their being pressed backward out of a vertical position in carrying the grain from the platform.

The mechanism by which the driver or attendant operates the rake consists of the parts below enumerated. E is a treadle fulcrumed to the driver's platform A, and connected by a rod, F, to a bell-crank, G, fulcrumed to an upright, H, upon the said platform. The opposite arm of the crank G is connected by a second rod, I, to a second bell-crank, J, fulcrumed to an oblique bar or support, K. A third rod or link, L, connects this crank to a lever, M, connected to the rake C by a crank-rod, $m$, detachably connected to the rake-head.

Having thus described my invention, what I claim, and desire to secure by Letters Patent, is—

1. The rake C, having the teeth $d\ d$ separately pivoted thereto, and connected to a rod, D, having lateral movement, substantially as and for the purpose set forth.

2. In combination with the pendants or studs $j\ k$ of the platform B, the rake C, having the teeth-operating rod D, provided with the bell-crank $g$ and slide $h$, substantially as and for the purpose set forth.

In testimony that I claim the foregoing as my own I affix my signature in presence of two witnesses.

JOS. F. STARK.

Witnesses:
L. D. SEBASTIAN,
J. J. BRADY.